(12) United States Patent
Shin

(10) Patent No.: US 12,342,104 B2
(45) Date of Patent: Jun. 24, 2025

(54) INTEGRATED DISPLAY FOR ELECTRIFIED VEHICLE CHARGE PORT

(71) Applicant: Honda Motor Co., Ltd., Tokyo (JP)

(72) Inventor: Cooper Koo Shin, Huntington Beach, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 83 days.

(21) Appl. No.: 18/505,299

(22) Filed: Nov. 9, 2023

(65) Prior Publication Data

US 2025/0159110 A1    May 15, 2025

(51) Int. Cl.
| | |
|---|---|
| *H04N 7/18* | (2006.01) |
| *B60L 53/16* | (2019.01) |
| *B60L 53/60* | (2019.01) |
| *G06Q 30/0283* | (2023.01) |
| *G06V 10/75* | (2022.01) |
| *G06V 20/56* | (2022.01) |
| *G06V 20/60* | (2022.01) |
| *H02J 7/00* | (2006.01) |

(52) U.S. Cl.
CPC ............... *H04N 7/18* (2013.01); *B60L 53/16* (2019.02); *B60L 53/60* (2019.02); *G06Q 30/0283* (2013.01); *G06V 10/751* (2022.01); *G06V 20/56* (2022.01); *G06V 20/60* (2022.01); *B60L 2250/12* (2013.01); *B60L 2250/16* (2013.01); *H02J 7/00045* (2020.01)

(58) Field of Classification Search
None
See application file for complete search history.

(56) References Cited

U.S. PATENT DOCUMENTS

| | | | |
|---|---|---|---|
| 7,999,665 | B2 | 8/2011 | Chander et al. |
| 9,789,783 | B2 | 10/2017 | Grider et al. |
| 10,189,361 | B2 | 1/2019 | Yamazaki |
| 11,263,836 | B1 | 3/2022 | Badger et al. |
| 2022/0355692 | A1* | 11/2022 | Hetrich ............... B60L 53/14 |
| 2024/0051416 | A1* | 2/2024 | Hetrich ............... B60L 53/16 |
| 2024/0149739 | A1* | 5/2024 | Burns ................. B60L 53/16 |
| 2025/0018793 | A1* | 1/2025 | Jones ................. B60K 35/22 |

FOREIGN PATENT DOCUMENTS

| | | |
|---|---|---|
| CN | 108128174 A | 6/2018 |
| CN | 111391695 A | 7/2020 |

\* cited by examiner

*Primary Examiner* — Samira Monshi
(74) *Attorney, Agent, or Firm* — Plumsea Law Group, LLC

(57) ABSTRACT

In one embodiment, an exterior charging interface for an electrified vehicle is provided. The exterior charging interface includes a charge port electrically connected to a battery of the electrified vehicle. The exterior charging interface also includes a display adjacent to the charge port. The exterior charging interface further includes a camera. The camera is configured to capture an image of a charger plug and the display is configured to display a message indicating compatibility between the charger plug and the charge port of the electrified vehicle.

20 Claims, 8 Drawing Sheets

INTEGRATED DISPLAY FOR ELECTRIFIED VEHICLE CHARGE PORT

BACKGROUND

The embodiments disclosed herein relate generally to electrified vehicles, and in particular, to an integrated display for a charge port of an electrified vehicle. As electrified vehicles become more common, the electric charging infrastructure to support charging of these electrified vehicles is also growing and expanding. A number of competing standards for plug types and connectors for charging electrified vehicles have emerged. As a result, depending on the type of connector and plug shape, an electrified vehicle may not be able to use a particular charger without an adaptor.

Additionally, given the different types of chargers, relevant information to a user when charging the electrified vehicle may not be easily found or presented to the user, especially when the user finds themselves using a charger that may be different from the typical charger they are accustomed to using.

There exists a need in the art for an integrated display for a charge port of an electrified vehicle that may provide relevant and helpful information to a user attempting to charge the electrified vehicle

SUMMARY

The techniques of the present embodiments described herein provide an integrated display for a charge port of an electrified vehicle and a method of using the integrated display to provide relevant and helpful information to a user attempting to charge the electrified vehicle.

In one aspect, an exterior charging interface for an electrified vehicle is provided. The exterior charging interface includes a charge port electrically connected to a battery of the electrified vehicle. The exterior charging interface also includes a display adjacent to the charge port. The exterior charging interface further includes a camera. The camera is configured to capture an image of a charger plug and the display is configured to display a message indicating compatibility between the charger plug and the charge port of the electrified vehicle.

In another aspect, a method for determining a charger plug compatibility with a charge port of an electrified vehicle is provided. The method includes capturing an image of a charger plug of a charger, comparing the captured image of the charger plug to a database of charger configuration types to identify a charger configuration of the charger plug, and determining compatibility between the identified charger configuration of the charger plug and a configuration of a charge port of the electrified vehicle. The method also includes displaying the determined compatibility result on a display adjacent to the charge port on an exterior of the electrified vehicle.

In another aspect, an exterior charging interface for an electrified vehicle is provided. The exterior charging interface includes a charge port electrically connected to a battery of the electrified vehicle and a touchscreen display adjacent to the charge port. At least one charging limit setting is configured to be changed through the touchscreen display on an exterior of the electrified vehicle.

Other systems, methods, features and advantages of the exemplary embodiments will be, or will become, apparent to one of ordinary skill in the art upon examination of the following figures and detailed description. It is intended that all such additional systems, methods, features and advantages be included within this description and this summary, be within the scope and protected by the claims.

BRIEF DESCRIPTION OF THE DRAWINGS

The exemplary embodiments may be better understood with reference to the following drawings and description. The components in the figures are not necessarily to scale. Moreover, in the figures, like reference numerals designate corresponding parts throughout the different views.

DETAILED DESCRIPTION

The example embodiments described herein provide an integrated display for a charge port of an electrified vehicle and a method of using the integrated display to provide relevant and helpful information to a user attempting to charge the electrified vehicle. The techniques described herein assist owners or users of electrified vehicles to identify appropriate charging plug types that are compatible with the charge port of their electrified vehicle and determine whether an adaptor is needed. The techniques described herein also allow owners or users of electrified vehicles to perform various functions through an exterior charging interface on the electrified vehicle.

Figure 1:
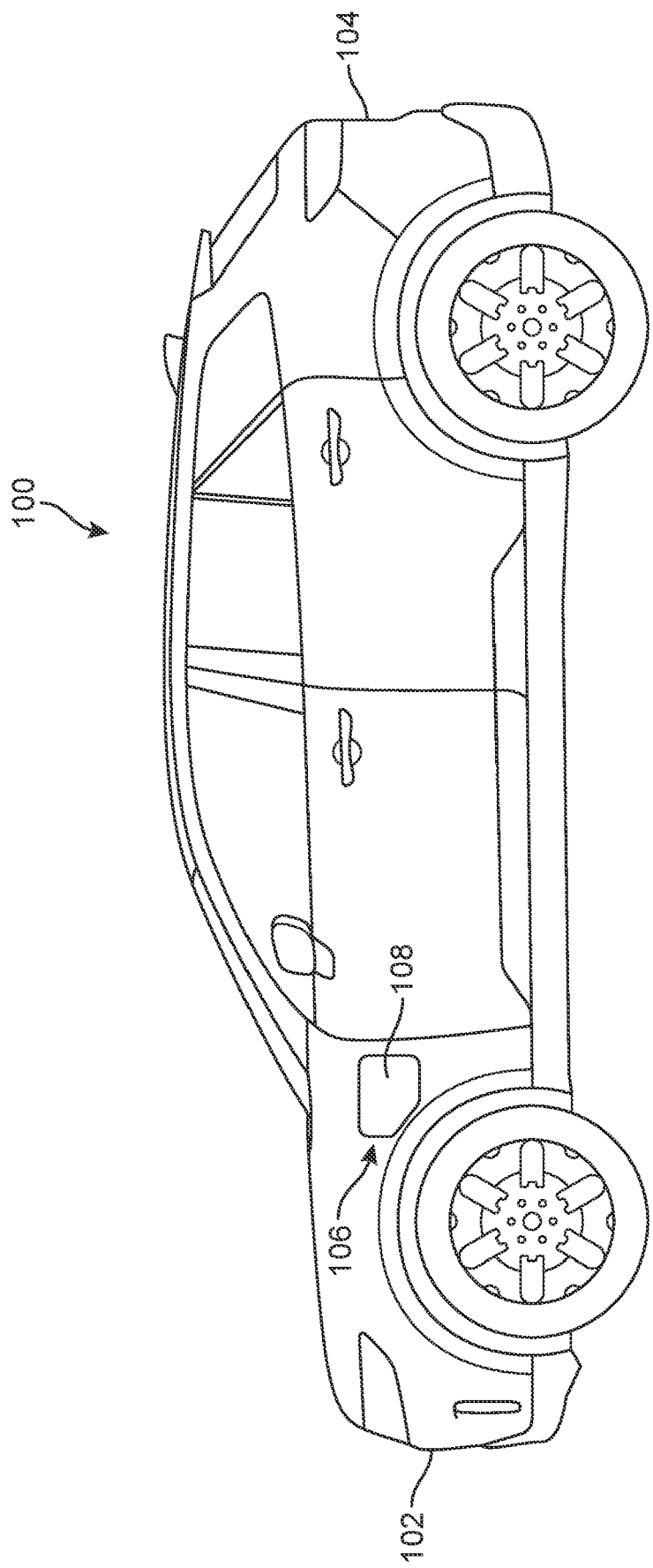
FIG. 1 is a representative view of an example embodiment of an electrified vehicle including a charge port with an integrated display.

FIG. 1 is a representative view of an example embodiment of an electrified vehicle 100 including an exterior charging interface having a charge port with an integrated display. In this embodiment, electrified vehicle 100 has a front end 102 and a rear end 104 and includes an exterior charging interface 106 that is located closer to front end 102 than rear end 104. In other embodiments, exterior charging interface 106 may be located at other areas of electrified vehicle 100, such as on either side of electrified vehicle 100, closer to rear end 104 than front end 102 of electrified vehicle 100, or at front end 102 or rear end 104 of electrified vehicle 100. In an example embodiment, exterior charging interface 106 may be covered or enclosed by an access panel 108.

In this embodiment, electrified vehicle 100 is a battery electric vehicle that includes an electric motor powered by a battery. In other embodiments, electrified vehicle 100 may be another type of electrified vehicle. As used herein, electrified vehicles may include an electric vehicle powered by a battery or fuel cell (i.e., a battery electric vehicle (BEV) or fuel cell vehicle (FCV)) as well as a hybrid electric vehicle powered by an electric motor, generator, or battery in addition to an internal combustion engine (i.e., a hybrid electric vehicle (HEV) or plug-in hybrid electric vehicle (PHEV)). The techniques of the present embodiments may be applied to any type of electrified vehicle that includes a charge port for charging the electrified vehicle.

Figure 2:
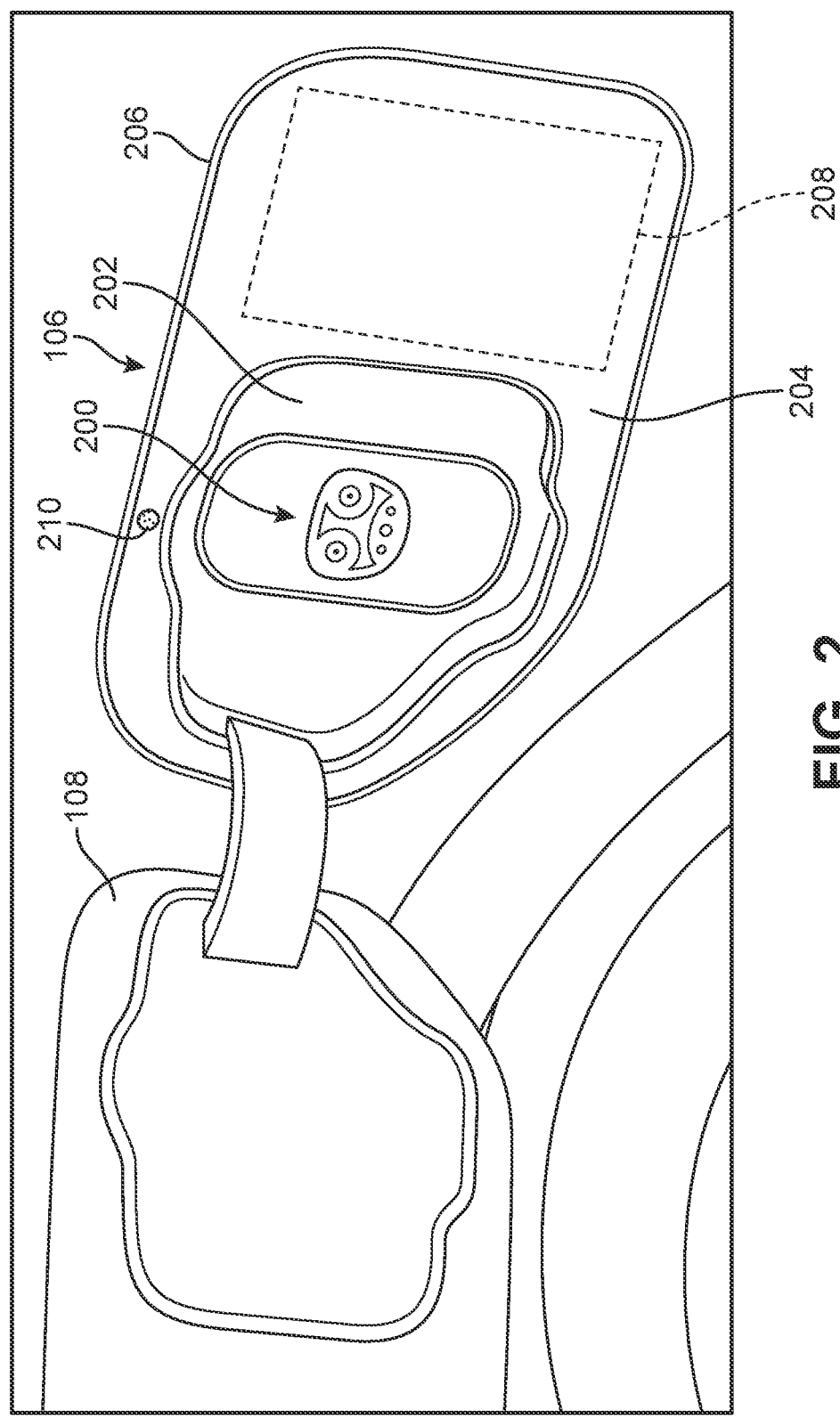
FIG. 2 is a representative view of an example embodiment of an exterior charging interface for an electrified vehicle including a charge port with an integrated display.
Figure 3:
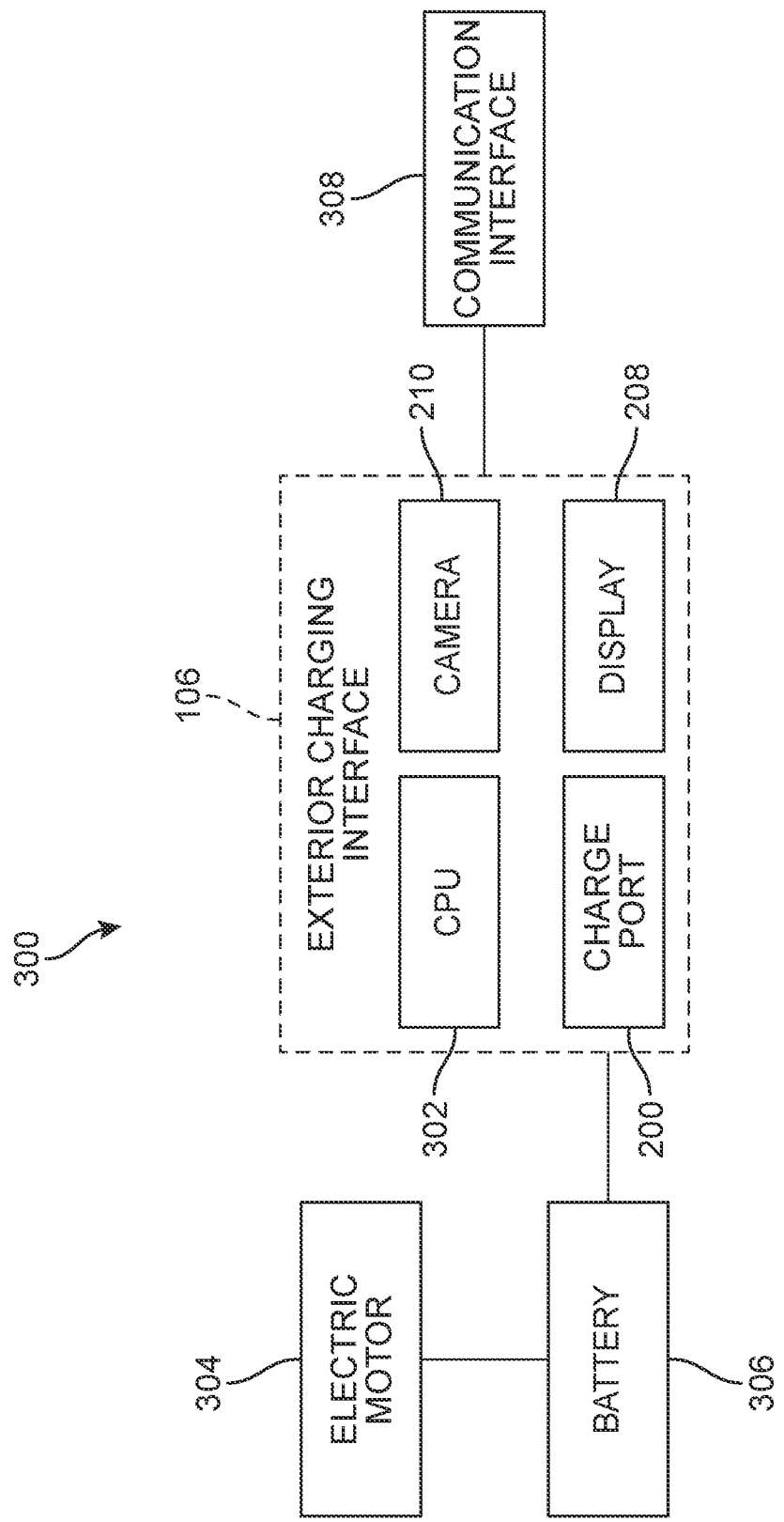
FIG. 3 is a block diagram of an example embodiment of a charging system for an electrified vehicle including an exterior charging interface.

FIG. 2 is a representative view of an example embodiment of exterior charging interface 106 for electrified vehicle 100 including a charge port 200 with an integrated display. In this embodiment, exterior charging interface 106 for electrified vehicle 100 includes charge port 200 that is electrically connected to an electric power system of electrified vehicle 100. For example, in one embodiment, charge port 200 may be electrically connected to a battery configured to power an electric motor (as shown in FIG. 3).

Charge port 200 is configured to engage or mate with a particular type of electric charger configuration associated with one of a number of different standards or specifications. Different types or standards for electric chargers are currently known or may be developed, including, but not limited to: Tesla, SAE Combined Charging System (CCS), and CHAdeMO, among others, including region or country-specific standards or specifications. Each of these different charger types or specifications use different plug configurations. As a result, if a particular charge port of an electrified vehicle is associated with a different type of standard or specification from the type of standard or specification associated with a plug of an electric charger, charging may not be possible without a corresponding adaptor that allows the charger plug and charge port to mate with each other.

In this embodiment, exterior charging interface 106 includes a housing 202 disposed around charge port 200 and a panel 204 surrounding housing 202 and charge port 200. In one embodiment, a bezel 206 extends around panel 204, housing 202, and charge port 200 and defines an outer perimeter of exterior charging interface 106. In an example embodiment, a display 208 may be disposed beneath panel 204 such that images or text displayed on display 208 are visible to a user through panel 204. In some embodiments, display 208 may be a touchscreen display and/or areas of panel 204 disposed over or adjacent to display 208 may be receptive to touch inputs from a user, using, for example, a capacitive touch sensor, force touch sensor, or other technology that is configured to sense or register a touch input from a user.

In this embodiment, display 208 of exterior charging interface 106 is located to one side of charge port 200, for example, to the right side as shown in FIG. 2. In other embodiments, the location of display 208 relative to the location of charge port 200 may vary. In an example embodiment, access panel 108 may be in the form of a hinged door that covers exterior charging interface 106, including panel 204, display 208, charge port 200, and housing 202, in a closed configuration and allows access to exterior charging interface 106 in an open configuration (as shown in FIG. 2).

In some embodiments, display 208 may turn on in response to access panel 108 transitioning from the closed configuration to the open configuration. In addition, transitioning access panel 108 from the open configuration to the closed configuration (e.g., covering display 208) may automatically turn off display 208. With this arrangement, display 208 may be configured only to be powered on when access panel 108 is in the open configuration to minimize electrical power consumption.

In some embodiments, exterior charging interface 106 may also include a camera 210. In this embodiment, camera 210 is disposed above charge port 200 within or behind panel 204 above housing 202 and below bezel 206. In other embodiments, camera 210 may be located at different areas of exterior charging interface 106. In an example embodiment, camera 210 is configured to face outwards away from an exterior of electrified vehicle 100 so that camera 210 may obtain or capture images of a charger plug facing in the direction of exterior charging interface 106 and charge port 200.

In an example embodiment, camera 210 may provide captured images of a charger plug to a processor or other computing system that identifies the type or standard of the charger plug configuration and determines whether that type or standard of charger plug is compatible with charge port 200. The results of the determined compatibility, including, for example, the necessity of a charging adaptor, may be displayed to a user via display 208 of exterior charging interface 106 directly adjacent to charge port 200. With this arrangement, a user may be immediately informed of the compatibility or lack thereof between a charger plug and charge port 200 from the exterior of electrified vehicle 100.

Referring now to FIG. 3, a block diagram of an example embodiment of a charging system 300 for electrified vehicle 100 including exterior charging interface 106 is shown. In this embodiment, charging system 300 includes exterior charging interface 106, described above, including charge port 200, display 208, and camera 210, as well as a central processing unit (CPU) 302. In some embodiments, CPU 302 may be a dedicated processor or other computing device associated with exterior charging interface 106 that is configured to control operations of exterior charging interface 106. In other embodiments, CPU 302 may be a processor or computing device associated with electrified vehicle 100, such as part of an onboard control system or other computing system, that is configured to control operations of exterior charging interface 106.

In this embodiment, exterior charging interface 106 may be in communication with other components of charging system 300 of electrified vehicle 100, including, but not limited to an electric motor 304 and a battery 306 of electrified vehicle 100. For example, in some embodiments, exterior charging interface 106 may receive charging information or battery capacity information from battery 306, which may be shown to a user on display 208 of exterior charging interface 106.

In some embodiments, exterior charging interface 106 may also be in communication with other components of electrified vehicle 100, such as a communication interface 308. Communication interface 308 may be configured to allow components of electrified vehicle 100, including exterior charging interface 106, to communicate with other devices via wireless telecommunication networks and to send and/or receive messages or alerts to users of exterior charging interface 106. For example, in one embodiment, communication interface 308 may be a wireless transceiver that transmits and/or receives signals (e.g., commands, messages, information, etc.) using any one or more types of wireless communication technologies.

In some cases, communication interface 308 may include short-range wireless communication technologies that allows exterior charging interface 106 to communicate with a mobile device (e.g., a smart phone or other smart device) of a user. In other cases, communication interface 308 may further include wide area network communication technologies that allows exterior charging interface 106 to communicate with remote devices, including, but not limited to payment processors, banks, charging service providers, a manufacturer of electrified vehicle 100, or other entities or parties located physically remote from exterior charging interface 106 and electrified vehicle 100.

Figure 4:
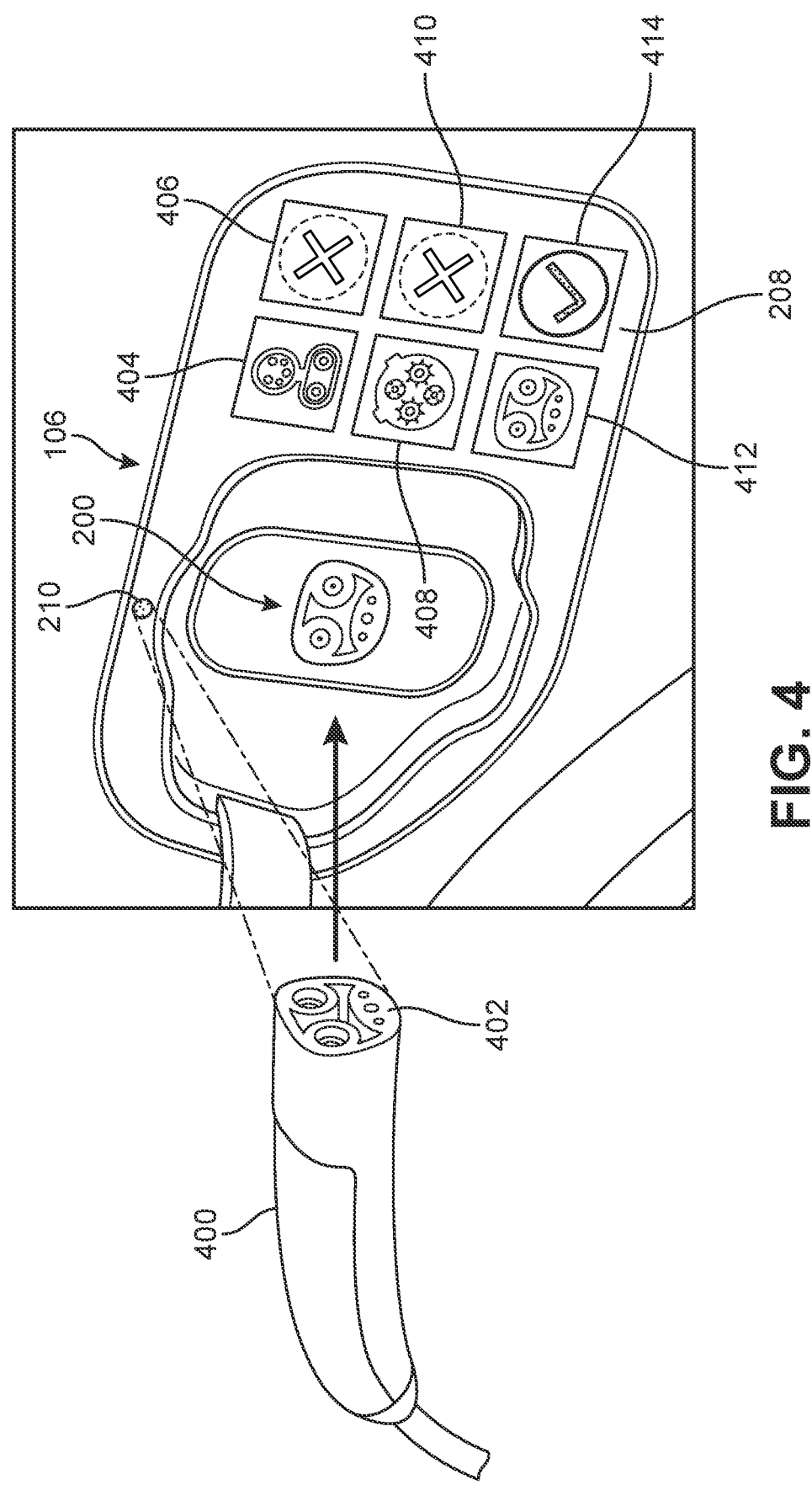
FIG. 4 is a schematic view of an electric charger plug being mated to a charge port of an electrified vehicle having an exterior charging interface.

Referring now to FIG. 4, a schematic view of an electric charger plug 400 being mated to charge port 200 of electrified vehicle 100 having exterior charging interface 106 is shown. In some embodiments, camera 210 of exterior charging interface 106 may automatically detect the configuration type or standard associated with charger plug 400 as it is being moved towards charge port 200 of electrified vehicle 100. For example, as shown in FIG. 4, as charger plug 400 approaches charge port 200 of exterior charging interface 106, camera 210 captures or obtains images of a charger configuration 402 at the end of charger plug 400.

Camera 210 may send or provide these images of charger configuration 402 at the end of charger plug 400 to a processor or computer (e.g., CPU 302 shown in FIG. 3) for analysis. The processor or computer may implement machine learning techniques to identify the corresponding type or standard associated with charger configuration 402 of charger plug 400 and display the compatibility of charger plug 400 and charge port 200 on display 208 of exterior charging interface 106. With this arrangement, a user may be informed whether or not an adaptor associated with charger configuration 402 is necessary for charge port 200 to successfully charge electrified vehicle 100 using charger plug 400.

As shown in FIG. 4, camera 210 has captured images of charger configuration 402 of charger plug 400 and display 208 shows the compatibility of charge port 200 with a variety of different charge plug types or standards. For example, in this embodiment, display 208 shows a first charger configuration 404 (e.g., CCS specification) and an indicator 406 with a message indicating that charge port 200 is not compatible with this type of charger without an adaptor. Similarly, display 208 shows a second charger configuration 408 (e.g., CHAdeMO specification) and an indicator 410 with a message indicating that charge port 200 is also not compatible with this type of charger without an adaptor. In this embodiment, display 208 shows a third charger configuration 412 (e.g., Tesla specification) and an indicator 414 with a message indicating that charge port 200 is compatible with this type of charger. With this arrangement, camera 210 may confirm compatibility between charger configuration 402 of charger plug 400 and charge port 200 on display 208 of exterior charging interface 106 to inform the user that charging may proceed.

In the event that the detected charger configuration of charger plug 400 was different from charge port 200 (e.g., first charger configuration 404 and/or second charger configuration 408), a message shown on display 208 of exterior charging interface 106 may inform the user that an adaptor of a particular type associated with the appropriate charger specification is needed. The user may then use camera 210 to confirm that the adaptor allows compatibility between the charger plug and charge port 200.

Figure 5:
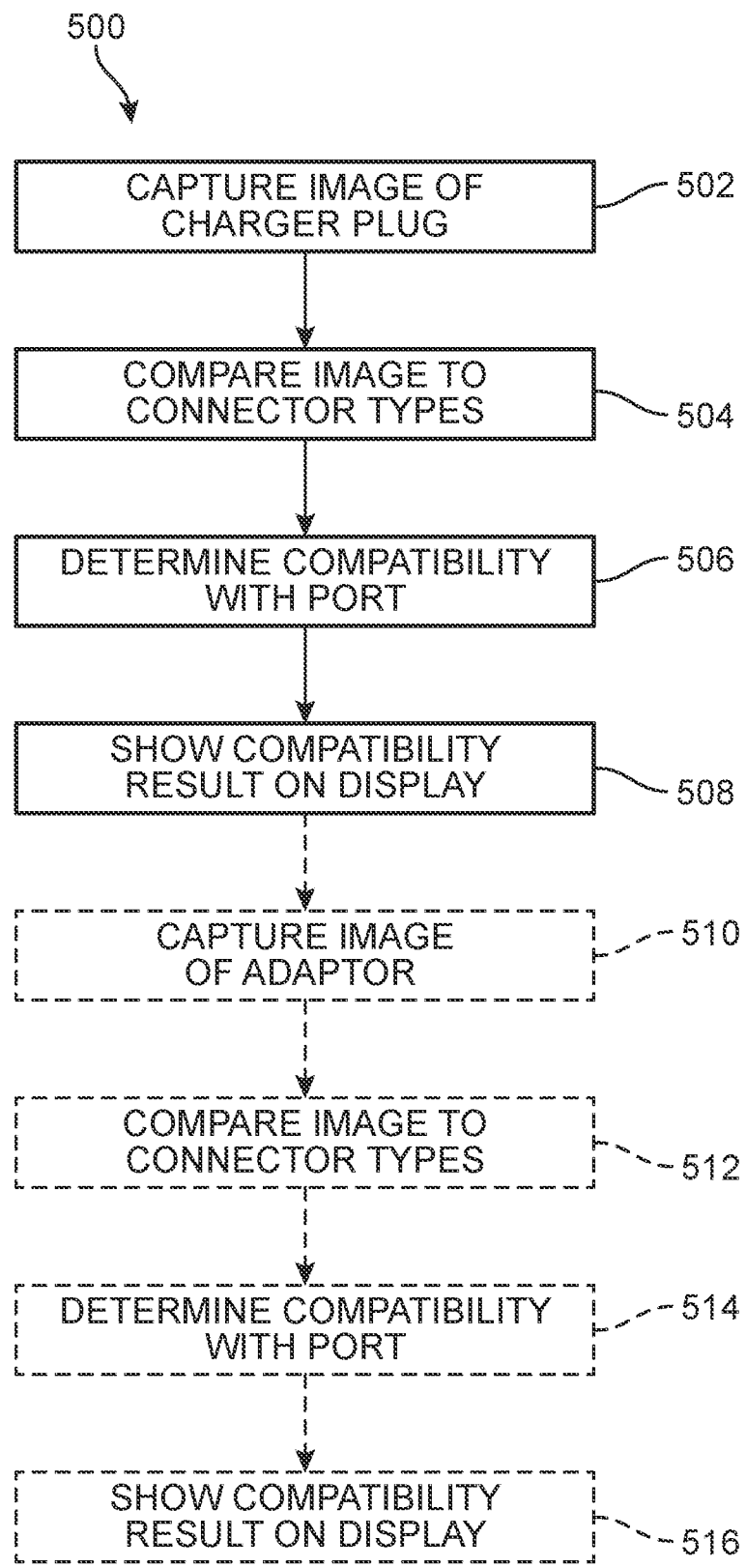
FIG. 5 is a flowchart of an example embodiment of a method for identifying and determining compatibility of a charger plug for charging an electrified vehicle.

FIG. 5 is a flowchart of an example embodiment of a method 500 for identifying and determining compatibility of a charger plug for charging an electrified vehicle. In some embodiments, method 500 may be implemented by a processor associated with exterior charging interface 106, such as CPU 302 shown in FIG. 3 and/or a processor associated with another system or component of electrified vehicle 100.

In an example embodiment, method 500 may begin in response to detecting that electrified vehicle 100 is being prepared or readied for charging. For example, method 500 may begin upon opening of access panel 108 of exterior charging interface 106. In this embodiment, method 500 includes an operation 502 where an image of a charger plug is captured or obtained. Operation 502 may include using camera 210 of exterior charging interface 106 to capture or obtain an image of charger configuration 402 of charger plug 400 as charger plug 400 moves towards charge port 200, as shown in FIG. 4.

After obtaining an image of the charger plug at operation 502, method 500 may proceed to an operation 504. At operation 504, the image of the charger plug is compared with various types of connector configurations to identify the type of configuration associated with the charger plug. For example, at operation 504, a machine learning process may be used by CPU 302 or other processor to determine a match between the charger configuration of the charger plug in the image obtained at operation 502 with a database of known charger connecter configurations. As described above, the database may include one or more images of connector configurations associated with Tesla, SAE Combined Charging System (CCS), CHAdeMO, and other region or country-specific standards or specifications.

Upon identifying the configuration of the charger plug at operation 504, method 500 may proceed to an operation 506. At operation 506, the compatibility of the identified charger configuration is determined for the charge port of the electrified vehicle. For example, at operation 506 the identified charger configuration of charger plug 400 (e.g., charger configuration 402) is compared with the configuration of charge port 200 of electrified vehicle 100. In some cases, exterior charging interface 106 may store in memory a setting or flag that identifies the type of configuration of charge port 200 associated with electrified vehicle 100. Based on the determined compatibility at operation 506, method 500 proceeds to an operation 508 where the determined compatibility result is shown on the display next to the charge port.

For example, as shown in FIG. 4, operation 508 may include showing the results of the compatibility determination at operation 506 on display 208 of exterior charging interface 106 next to charge port 200. With this arrangement, a user of exterior charging interface 106 may easily determine the relative compatibility between charger plug 400 and charge port 200 of electrified vehicle 100 from outside of the vehicle, including whether or not an adaptor is needed to enable charger plug 400 to mate with charge port 200.

Additionally, in some embodiments, method 500 may further include one or more additional operations for checking whether an adaptor is the correct or appropriate adaptor for charger plug 400 and charge port 200. In this embodiment, method 500 may include an operation 510 where an image of an adaptor is captured, for example, using camera 210, as described above in regard to operation 502.

Next, method 500 may include an operation 512 where the image of the adaptor is compared to one or more images of known adaptor types in a database, for example, using machine learning techniques or processes. After identifying the adaptor type at operation 512, method 500 may include an operation 514 where the compatibility of the identified adaptor configuration is compared with the configuration of the charge port of the electrified vehicle. For example, at operation 514, if charger plug 400 has a charger configuration associated with the SAE CCS specification and charge port 200 has a configuration associated with the Tesla standard, an adaptor converting from CCS to Tesla would be required to enable charging between charger plug 400 and electrified vehicle 100.

Based on the determined compatibility at operation 514, method 500 proceeds to an operation 516 where the determined compatibility result is shown on the display next to the charge port. For example, as shown in FIG. 4, operation 516 may include showing the results of the compatibility determination at operation 5014 on display 208 of exterior charging interface 106 next to charge port 200. With this arrangement, a user of exterior charging interface 106 may easily determine what type of adaptor is needed to enable charger plug 400 to mate with charge port 200 of electrified vehicle 100.

In some cases, the charging options available to user may vary between different types or manufacturers of electric chargers. Many chargers require a user to download a mobile application on their mobile device to control or change charging options. Additionally, in other cases, some charging options or settings may only be available to the user via the dashboard or onboard display inside the passenger compartment of the electrified vehicle. Requiring a user to search for these options on their mobile devices or nested within dashboard menu options may lead to a confusing and/or frustrating experience. In some embodiments, exterior charging interface 106 may provide charging options or other information on display 208 to a user from outside of electrified vehicle 100 so that the user may easily change charging limits or settings without needing to return inside the passenger cabin to read information from an interior display or dashboard or without requiring use of a mobile application on a user's mobile device.

Figure 6:
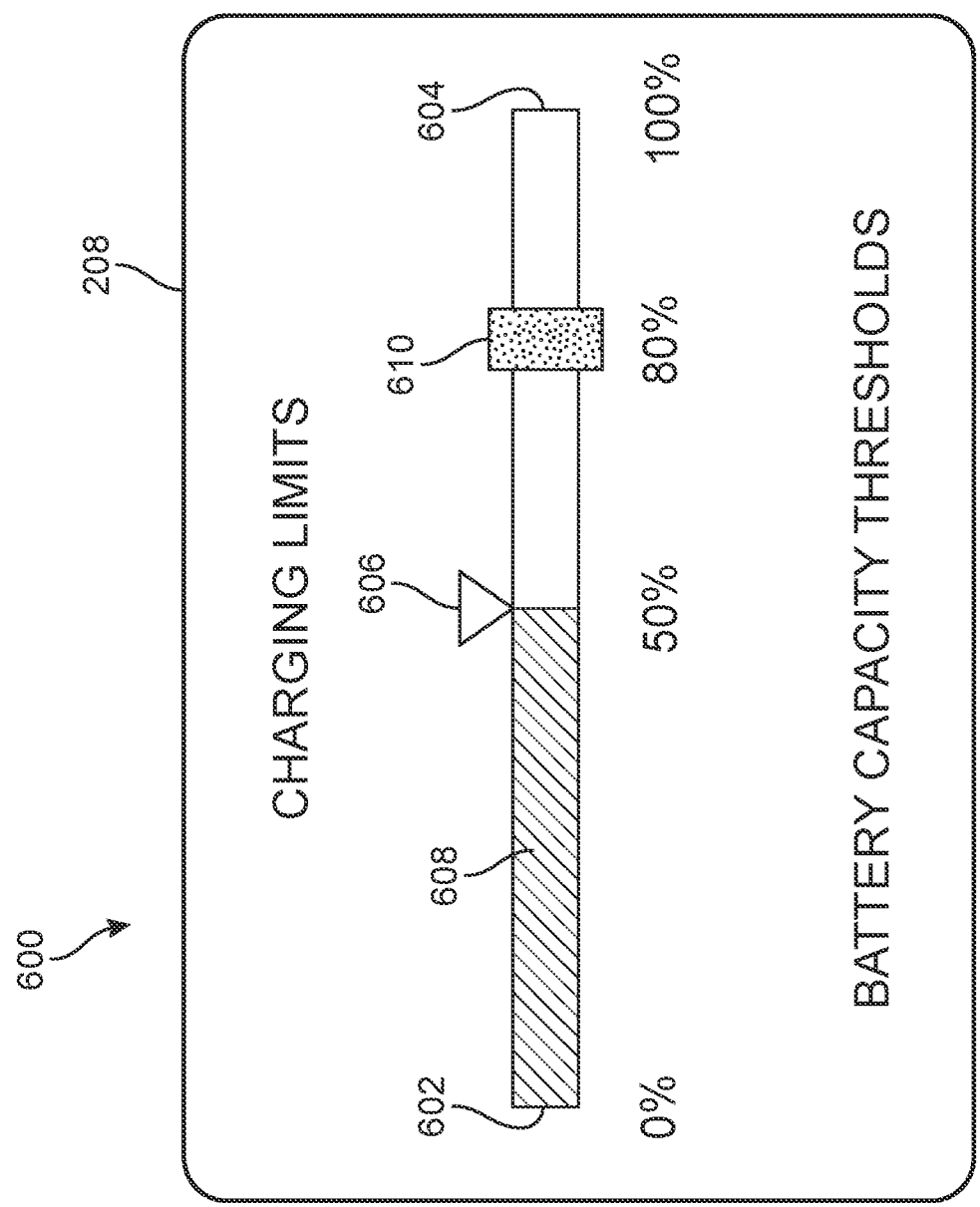
FIG. 6 is a schematic view of an example embodiment of an integrated display of an exterior charging interface to allow a user to set charging capacity limits for an electrified vehicle.

Referring now to FIG. 6, a schematic view of an example embodiment of integrated display 208 of exterior charging interface 106 is shown that allows a user to set charging capacity limits for electrified vehicle 100. In an example embodiment, display 208 may be a touchscreen display that detects and accepts inputs from a finger of a user for selecting or interacting with the images shown on display 208. In this embodiment, display 208 provides settable battery capacity thresholds 600 that may be changed by a user during charging of electrified vehicle 100.

As shown in FIG. 6, battery capacity thresholds 600 range from a minimum 602 of 0% charge to a maximum 604 of 100% charge. An indicator 606 shows a current battery capacity 608 of the battery of electrified vehicle 100 (e.g., battery 306 shown in FIG. 3). In this example, the battery has a current battery capacity 608 of approximately 50%. In some cases, it may not be practical or recommended to charge a battery of electrified vehicle 100 to full capacity (i.e., maximum 604=100%). As the battery approaches maximum 604, the time required to continue charging the battery may increase. Therefore, in many instances, a user of electrified vehicle 100 may only wish to charge the battery to a specific charging threshold that is sufficient for the user to reach their destination.

In this embodiment, touchscreen display 208 includes a graphical slider 610 that allows a user to adjust or change the charging threshold for the battery of electrified vehicle 100. That is, the user may their finger to move slider 610 in either direction to reduce or increase the charging threshold for the battery. For example, in this embodiment, slider 610 is set to a charging threshold of 80% of full capacity. With this arrangement, a user may easily adjust the charging threshold for the battery using integrated display 208 of exterior charging interface 106 next to charge port 200.

Figure 7:
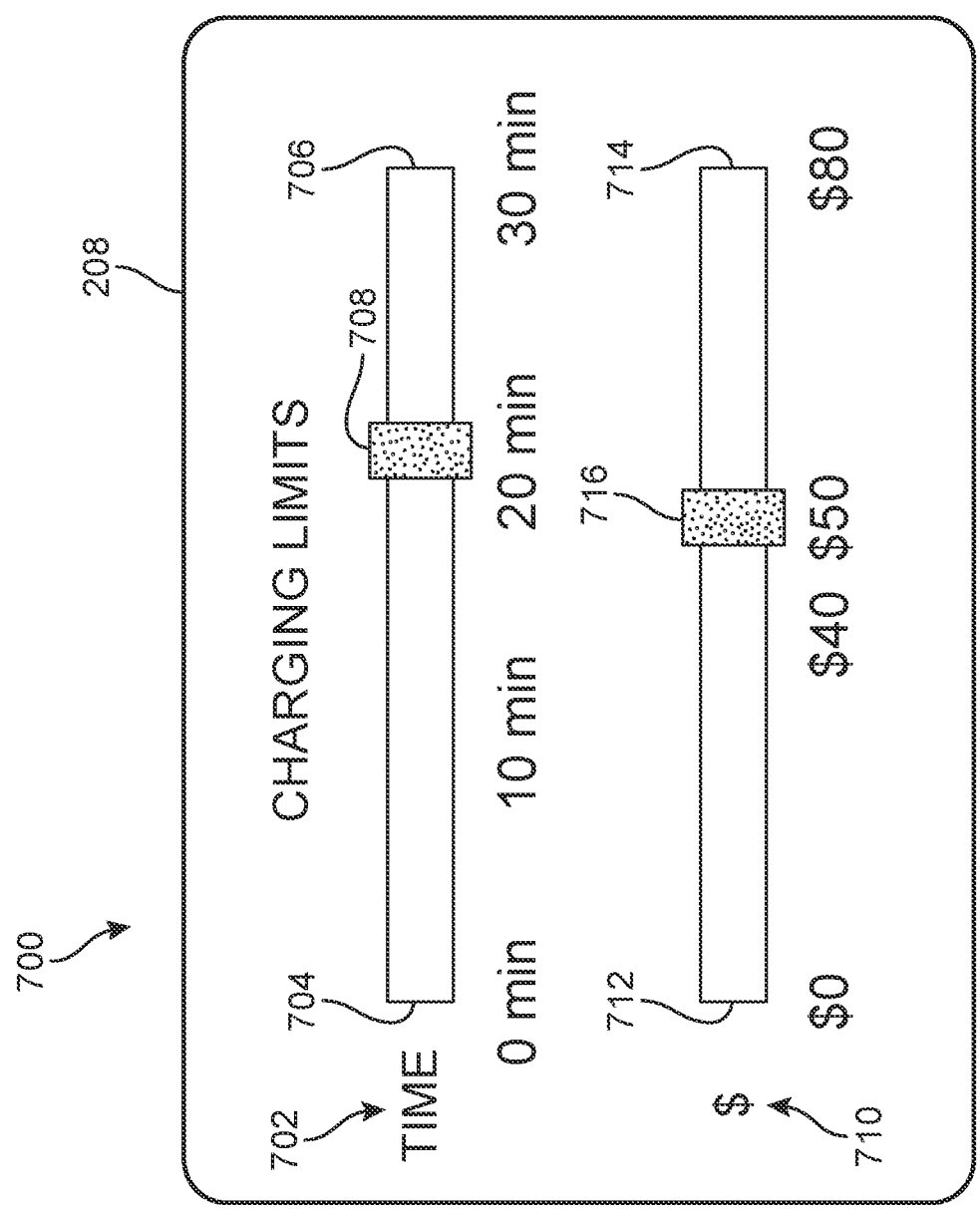
FIG. 7 is a schematic view of an example embodiment of an integrated display of an exterior charging interface to allow a user to set charging time or price limits for an electrified vehicle.

FIG. 7 is a schematic view of an example embodiment of integrated display 208 of exterior charging interface 106 that allows a user to set charging limits 700, such as a charging time or price limits for electrified vehicle 100. In some embodiments, a user may select or change other options or settings associated with charging electrified vehicle 100 using touchscreen display 208, as described above with regard to the previous embodiment of FIG. 6.

In this embodiment, a user may choose to adjust one or more charging limits 700, including a charging time 702 and/or a charging price 710. For example, as shown in FIG. 7, charging time 702 may range from a minimum 704 (e.g., 0 minutes) to a maximum 706 (e.g., 30 minutes). Using an adjustable slider 708, a user may set charging time 702 to a desired amount of time between minimum 704 and maximum 706. In this example, slider 708 is set to a charging time threshold of 20 minutes so that electrified vehicle 100 will automatically end or discontinue charging after the set charging time threshold of 20 minutes.

As also shown in FIG. 7, charging price 710 may range from a minimum 712 (e.g., $0) to a maximum 714 (e.g., $80). Using an adjustable slider 716, a user may set charging price 710 to a desired amount of money between minimum 712 and maximum 714. In this example, slider 716 is set to a charging price threshold of $50 so that electrified vehicle 100 will automatically end or discontinue charging after the set charging price threshold of $50. It should be understood that maximum 706 of charging time 702 and maximum 714 of charging price 710 are merely exemplary and other values for maximum 706, 714 may be provided. With this arrangement, a user may easily and conveniently adjust the charging time and/or price thresholds when charging the battery of electrified vehicle 100 using integrated display 208 of exterior charging interface 106 next to charge port 200.

Figure 8:
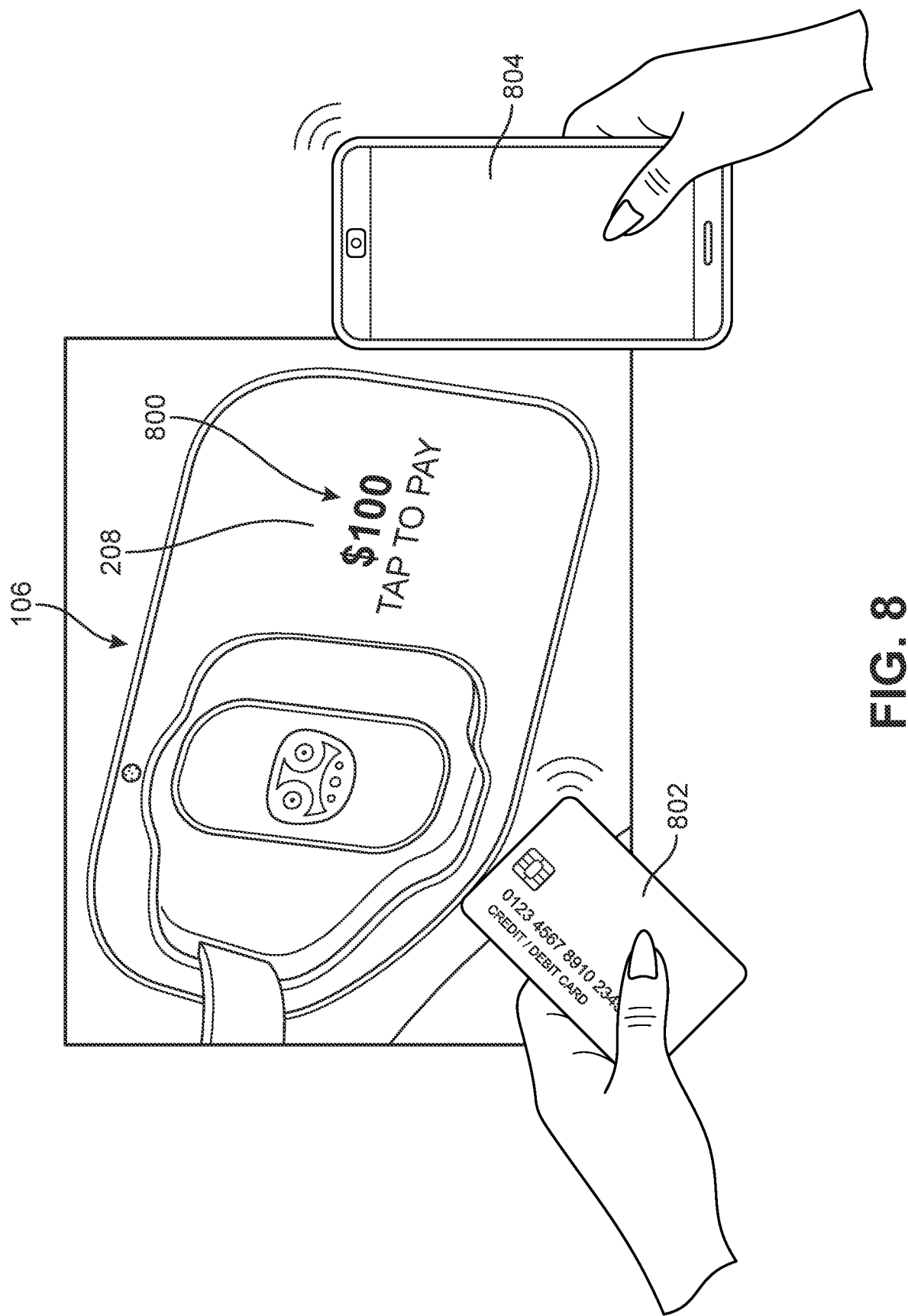
FIG. 8 is a schematic view of an example embodiment of an integrated display of an exterior charging interface to allow a user to pay for charging an electrified vehicle.

Referring now to FIG. 8, a schematic view of an example embodiment of integrated display 208 of exterior charging interface 106 is shown allowing a user to pay for charging electrified vehicle 100 directly through exterior charging interface 106. As noted above, different chargers may operate differently and may require a user to download a mobile application to their mobile device in order to use and/or pay for charging their electrified vehicle. In an example embodiment, payment for charging services may be performed directly through exterior charging interface 106 on electrified vehicle 100 itself.

As shown in FIG. 8, upon initiation or completion of charging electrified vehicle 100, display 208 of exterior charging interface 106 may display a payment message 800. In this embodiment, exterior charging interface 106 may be in communication with a charging service provider, payment processor, bank, or other entity for receiving payment for charging services through communication interface 308 (shown in FIG. 3). Additionally, in this embodiment, exterior charging interface 106 may also include short range wireless communication technologies, such as NFC, Bluetooth, WiFi, RFID, or others, that permits exterior charging interface 106 to receive payment from one or more user devices, including, but not limited to a bank card 802 including a payment chip and/or a mobile device 804 that includes wireless payment capabilities.

With this arrangement, a user may tender payment for charging services directly through exterior charging interface 106 on electrified vehicle 100 itself, rather than needing to download different mobile applications for each brand or charger manufacturer. Exterior charging interface 106 with display 208 next to charge port 200 of electrified vehicle 100 simplifies the charging process for users of electrified vehicles.

Additionally, in some embodiments, display 208 of exterior charging interface 106 may also display any information related to charging electrified vehicle 100. For example, a connection status of a charger plug, progress of charging of the battery, charging rate, charging costs, charging time, time until completion of charging, instructions for connecting or disconnecting charger plug 400 from charge port 200, including instructional or assistive videos, and/or other charging-related information may be shown on display 208.

While various embodiments have been described, the description is intended to be exemplary, rather than limiting and it will be apparent to those of ordinary skill in the art that many more embodiments and implementations are possible that are within the scope of the claims. Additionally, one or more of the various embodiments described above may be combined in part or in whole in accordance with the principles described herein. Accordingly, the embodiments are not to be restricted except in light of the attached claims and their equivalents. Also, various modifications and changes may be made within the scope of the attached claims.

The invention claimed is:

1. An exterior charging interface for an electrified vehicle comprising:
a charge port electrically connected to a battery of the electrified vehicle;
a display adjacent to the charge port; and
a camera;
wherein the camera is configured to capture an image of a charger plug and the display is configured to display a message indicating compatibility between the charger plug and the charge port of the electrified vehicle.

2. The exterior charging interface according to claim 1, further comprising a housing surrounding the charge port.

3. The exterior charging interface according to claim 2, wherein the camera is disposed within the housing surrounding the charge port.

4. The exterior charging interface according to claim 2, further comprising a panel that extends around the housing and over the display.

5. The exterior charging interface according to claim 4, further comprising an access panel configured to cover the panel, the charge port, and the display in a closed configuration.

6. The exterior charging interface according to claim 5, wherein upon transitioning the access panel from the closed configuration to an open configuration, the display is configured to automatically turn on.

7. The exterior charging interface according to claim 1, wherein the message indicating compatibility between the charger plug and the charge port of the electrified vehicle displays an image of a charger configuration of at least one of the charge port of the electrified vehicle or the charger plug.

8. The exterior charging interface according to claim 1, wherein the display comprises a touchscreen that is configured to receive inputs from a user.

9. The exterior charging interface according to claim 1, further comprising a communication interface that permits the exterior charging interface to connect to a mobile device.

10. A method for determining a charger plug compatibility with a charge port of an electrified vehicle, the method comprising:
capturing an image of a charger plug of a charger;
comparing the captured image of the charger plug to a database of charger configuration types to identify a charger configuration of the charger plug;
determining compatibility between the identified charger configuration of the charger plug and a configuration of a charge port of the electrified vehicle; and
displaying the determined compatibility result on a display adjacent to the charge port on an exterior of the electrified vehicle.

11. The method according to claim 10, wherein the camera is disposed in a housing surrounding the charge port of the electrified vehicle.

12. The method according to claim 10, wherein the determined compatibility result is shown as a message on the display.

13. The method according to claim 12, wherein the message indicating compatibility between the charger plug and the charge port of the electrified vehicle displays an image of a charger configuration of at least one of the charge port of the electrified vehicle or the charger plug.

14. The method according to claim 10, further comprising:
capturing an image of an adaptor for the charger plug;
comparing the captured image of the adaptor for the charger plug to the database of charger configuration types to identify a charger configuration of the adaptor;
determining compatibility between the identified charger configuration of the adaptor and the configuration of the charge port of the electrified vehicle; and
displaying the determined compatibility result on the display adjacent to the charge port on an exterior of the electrified vehicle.

15. The method according to claim 10, wherein the camera, the charge port, and the display are integrated into an exterior charging interface on an exterior of the electrified vehicle.

16. The method according to claim 15, wherein the exterior charging interface includes an access door that covers the camera, the charge port, and the display in a closed configuration; and
wherein the method further includes automatically turning on the display upon transitioning the access door from the closed configuration to an open configuration.

17. The method according to claim 10, wherein the display comprises a touchscreen that is configured to receive inputs from a user; and
wherein the method further comprises changing at least one charging limit setting through the display.

18. An exterior charging interface for an electrified vehicle comprising:
a charge port electrically connected to a battery of the electrified vehicle;
a touchscreen display adjacent to the charge port; and
wherein at least one charging limit setting is configured to be changed through the touchscreen display on an exterior of the electrified vehicle.

19. The exterior charging interface according to claim 18, wherein the at least one charging limit setting includes a battery capacity; and
wherein a battery capacity threshold is adjusted by interacting with the touchscreen.

20. The exterior charging interface according to claim 18, wherein the least one charging limit setting includes a charging time or a charging price; and wherein a charging time threshold or a charging price threshold is adjusted by interacting with the touchscreen.

\* \* \* \* \*